US011206330B1

(12) United States Patent
Nguyen et al.

(10) Patent No.: US 11,206,330 B1
(45) Date of Patent: Dec. 21, 2021

(54) INTERACTIVE VOICE RESPONSE USING INTENT PREDICTION AND A 5G CAPABLE DEVICE

(71) Applicant: T-Mobile USA, Inc., Bellevue, WA (US)

(72) Inventors: Phi Nguyen, Lacey, WA (US); Nathaniel Blodgett, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 17/009,673

(22) Filed: Sep. 1, 2020

(51) Int. Cl.
| H04M 3/51 | (2006.01) |
| H04W 8/22 | (2009.01) |
| H04M 15/00 | (2006.01) |
| H04N 7/14 | (2006.01) |
| H04W 84/04 | (2009.01) |

(52) U.S. Cl.
CPC ....... *H04M 3/5166* (2013.01); *H04M 3/5141* (2013.01); *H04M 15/41* (2013.01); *H04N 7/147* (2013.01); *H04W 8/22* (2013.01); *H04W 84/04* (2013.01)

(58) Field of Classification Search
USPC ....................................... 455/414.1
See application file for complete search history.

(56) References Cited

U.S. PATENT DOCUMENTS

| 8,650,303 | B1 * | 2/2014 | Lang ..................... H04W 12/37 709/226 |
| 9,049,295 | B1 * | 6/2015 | Cooper .............. G06Q 30/0277 |
| 9,105,268 | B2 | 8/2015 | Srivastava et al. |
| 9,460,237 | B2 | 10/2016 | Nguyen et al. |
| 9,570,070 | B2 | 2/2017 | Baldwin et al. |
| 9,652,797 | B2 | 5/2017 | Vijayaraghavan et al. |
| 9,733,894 | B2 | 8/2017 | Brown et al. |
| 9,742,912 | B2 | 8/2017 | Srivastava et al. |
| 10,018,977 | B2 | 7/2018 | Cipollo et al. |
| 10,257,314 | B2 | 4/2019 | Agrawal et al. |
| 10,334,415 | B2 | 6/2019 | Kwong et al. |
| 10,460,734 | B2 | 10/2019 | Jones et al. |
| 10,482,521 | B2 | 11/2019 | Vijayaraghavan et al. |
| 2007/0165799 | A1 | 7/2007 | Juncker |
| 2014/0079195 | A1 | 3/2014 | Srivastava et al. |
| 2014/0330769 | A1 | 11/2014 | Lindseth et al. |
| 2015/0012829 | A1 | 1/2015 | Brown et al. |
| 2015/0169285 | A1 | 6/2015 | Reyes et al. |

(Continued)

*Primary Examiner* — Amal S Zenati
(74) *Attorney, Agent, or Firm* — Perkins Coie LLP

(57) ABSTRACT

Disclosed here is a method to determine a user intent when a user device initiates an interactive voice response (IVR) call with a wireless telecommunication network. A processor can detect the IVR call initiated with the network and determine whether the user device is a member of the network. Upon determining that the user device is a member of the network, the processor can obtain user history including interaction history between the user and the network. Based on the user history, the processor can predict the user intent when the user initiates the IVR call. The processor can detect whether user device is a 5G capable device. Upon the determining that the device is 5G capable and based on the predicted user intent, the processor can suggest to the user an application configured to execute on the user device and configured to address the predicted user intent.

18 Claims, 6 Drawing Sheets

(56) References Cited

U.S. PATENT DOCUMENTS

| | | |
|---|---|---|
| 2015/0288818 A1 | 10/2015 | Srivastava et al. |
| 2016/0364441 A1 | 12/2016 | Nguyen et al. |
| 2017/0097618 A1 | 4/2017 | Cipollo et al. |
| 2017/0213274 A1 | 7/2017 | Vijayaraghavan et al. |
| 2017/0270925 A1 | 9/2017 | Kennewick et al. |
| 2017/0300296 A1 | 10/2017 | Brown et al. |
| 2017/0374176 A1 | 12/2017 | Agrawal et al. |
| 2018/0053233 A1* | 2/2018 | Srivastava ............ G06F 16/951 |
| 2018/0268821 A1 | 9/2018 | Levanon |
| 2018/0274927 A1 | 9/2018 | Epperlein et al. |
| 2018/0364975 A1 | 12/2018 | Kwong et al. |
| 2018/0367941 A1 | 12/2018 | Kwong et al. |
| 2019/0279647 A1 | 9/2019 | Jones et al. |
| 2019/0306327 A1 | 10/2019 | Matysiak et al. |

\* cited by examiner

INTERACTIVE VOICE RESPONSE USING INTENT PREDICTION AND A 5G CAPABLE DEVICE

BACKGROUND

Interactive voice response (IVR) allows users to interact with a company's host system via a telephone keypad or by speech recognition, after which services can be inquired about through the IVR dialogue. Usually, the IVR systems can respond with pre-recorded audio containing static menus to further direct users on how to proceed. The static menus can be complex, and after a few selections, the user can forget all the selections made, and feel lost in the labyrinth of options.

DETAILED DESCRIPTION

Disclosed here is a method to determine a user intent when a user initiates an IVR call with a service provider for a wireless telecommunication network. A processor can detect the IVR call initiated with the service provider for the wireless telecommunication network and determine whether the user is a member of, or subscriber with, the wireless telecommunication network. Upon determining that the user is a member of the wireless telecommunication network, the processor can obtain history associated with the user including interaction history between the user and the wireless telecommunication network or a user billing status associated with the user of the wireless telecommunication network. Based on the history associated with the user, the processor can predict the user intent when the user initiates the IVR call. Upon determining that the user is a member of the wireless telecommunication network, the processor can detect whether a device used to initiate the IVR call is a 5G capable device. Upon the determining that the device is the 5G capable device and based on the predicted user intent, the processor can suggest to the user an application configured to execute on the device used to initiate the IVR call and configured to address the predicted user intent.

Even if the user device is not a 5G capable device, the processor can improve the IVR call experience by predicting the user intent, as described herein. Upon initiating the IVR call, the processor can verify the predicted user intent by receiving a natural language input from the user verifying the predicted user intent. Based on the predicted user intent, the processor can engage a software application, such as a bot, configured to address the predicted user intent. If the predicted user intent is not accurate, upon attempting to verify the user intent, the processor can receive a natural language input from the user indicating that the predicted user intent is not accurate and stating the actual intent. The processor can then determine the accurate user intent from the natural language input and engage a second software configured to address the accurate user intent.

Various examples of the invention will now be described. The following description provides certain specific details for a thorough understanding and enabling description of these examples. One skilled in the relevant technology will understand, however, that the invention can be practiced without many of these details. Likewise, one skilled in the relevant technology will also understand that the invention can include many other obvious features not described in detail herein. Additionally, some well-known structures or functions may not be shown or described in detail below, to avoid unnecessarily obscuring the relevant descriptions of the various examples.

Figure 1:
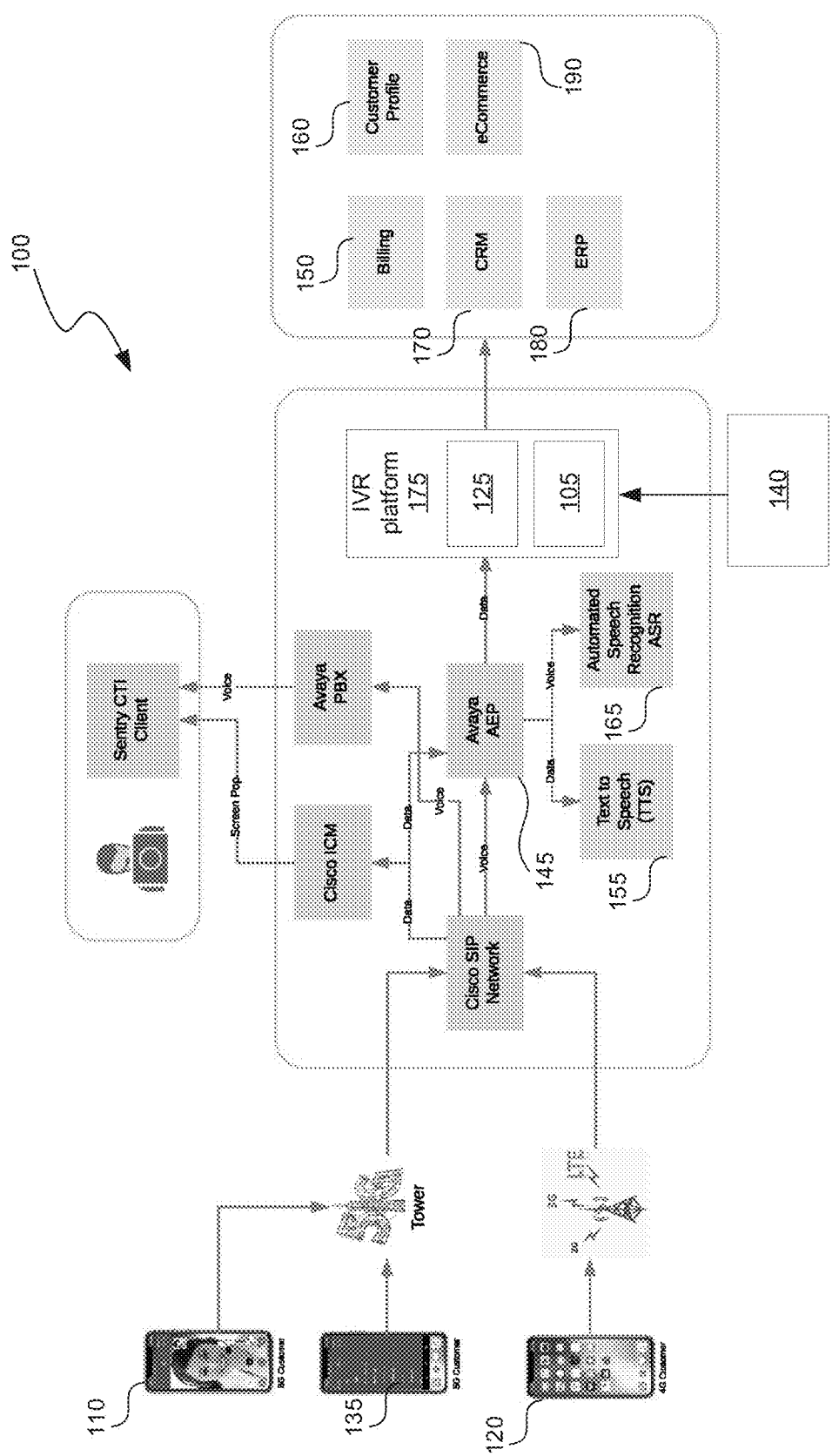
FIG. 1 shows a logical architecture of an IVR system capable of intent prediction.

FIG. 1 shows a logical architecture of an IVR system capable of intent prediction. The intent prediction IVR system 100 can work with both traditional mobile devices 110 such as 4G, 3G, 2G mobile devices, and 5G mobile devices 120.

Intent prediction IVR system 100 can provide a dynamic menu suited to the user of the mobile device 110, 120, instead of a static menu, independent of the user's intent and the user's expectation. To predict the user intent, the prediction module 130 can obtain data from various sources such as third-party sources 140 including social media posts, billing 150, and/or user's e-commerce activity 190. To obtain information about the user associated with the device 110, 120, the system 100 can determine a unique identifier of the device 110, 120, such as the phone number. Based on that unique identifier, the system 100 accesses various subsystems 140, 150, 160, 170, 180, 190 to gather data about the user.

If the device unique identifier is not associated with the various subsystems 150, 160, 170, 180, 190, the system 100 can infer that the device is not a user of the system 100. Consequently, the system 100 can direct the user to a prospective user line.

For example, user profile 160 stores information about how the user prefers to communicate with the system 100, such as through the web or applications installed on the device 110, 120, whether the user prefers a voice or video call, etc. User relationship management (CRM) 170 can store information about previous interactions with the user, such as locations from which the user called, frequently placed calls, family members and relationship between them within the same account profile who were calling an agent on similar topic. Topic includes billing or handset issues, product and services inquiry, etc. Enterprise resource planning (ERP) 180 can store information about previous user orders, forward and backward logistics of shipping type and status, status of the order in the supply chain, etc. E-commerce 190 stores information about items for sale, pricing and product bundle, popular items, a measure of popularity such as number of units sold, which items were sold to the user, etc. Billing 150 stores information about a user billing cycle, previous and current user bills, and payment type and history, e.g. if the user is current or in collection which can lead to potential offers.

A machine learning model 105 can take in the data from various sources 140, 150, 160, 170, 180, 190 and determine user behavioral patterns. For example, machine learning model 105 can determine the current time, such as whether it is the beginning or end of the year, or beginning or end of the month. Based on billing patterns stored in billing 150, the machine learning model 105 can determine whether the user tends to make payments at a particular time of year or month, such as at the beginning of the month, the beginning of the year, at the end of the month, and/or at the end of the year. If the current time overlaps a time when the user makes a payment, the system 100 can immediately create a dynamic menu asking the user "are you making a payment?"

In another example, the machine learning model 105 can take data from the CRM 170, and based on the user location, determine whether the user frequently travels internationally, or based on the frequently placed calls determine whether the user frequently calls internationally. If the user is an international traveler and/or a frequent international caller, the system 100 can offer upgrades to calling plans that offer discounts on calls from or to international locations.

In a third example, the system 100 can gather information from social media 140 to determine the user's intent. For example, the user could have been posting about a particular device, such as an iPhone, and the system 100 can infer that the user intent is to purchase the particular device when the user calls the system. In response, the system 100 can present the dynamic menu with the question "are you interested in purchasing an iPhone?"

In a fourth example, the subsystems 150, 160, 170, 180, 190 can also collect device 110, 120 diagnostics, such as the hardware specifications of the device and/or the software specifications. For example, the information that the device 110, 120 could have recently downloaded a new operating system upgrade can be stored in one of the subsystems 150, 160, 170, 180, 190. When the user places a call to the IVR system 100, the system can create a dynamic menu and ask the user if the user is calling about the recent software upgrade. Additionally, the device diagnostics such as processor speed or memory usage can be stored in the subsystems 150, 160, 170, 180, 190. As a result, the machine learning model 105 can detect that there has been a hardware slow down, such as slower processor speed. When the user places a call to the IVR system 100, the system can create a dynamic menu and ask the user if the user is calling about the hardware slow down.

In the fifth example, the IVR platform 175 can detect customer data usage based on data store in the subsystems 150, 160, 170 to determine if the user has regularly maxed out allocated internet data that were causing slowness in device internet usages. Based on the number of shared lines within the same account and/or the issue of device Internet usage, the system can create a dynamic menu and ask the user if the user wants to switch to a different plan.

In the sixth example, the IVR platform 175 can also detect if a user is calling into IVR because the user is not able to use internet or not able to place phone call at all through IVR application because the voice call is not available. With subsystem 150, 160, 170, 180, 190 data and network backhaul data availability, IVR 175 can query these subsystems to determine whether there are wireless telecommunication network outages at certain location and alert the user before the user reaches out to a live agent.

In response to the query about the intent, the user can provide a natural language response. The system 100 can receive a natural language response by data (e.g. via a text chat session) or voice (i.e., a spoken voice call). Utilizing natural language processing 115, the system 100 can understand the user's response. If the user's response indicates that the intent is incorrectly predicted, the system 100 can make another prediction about the intent or connect the user to an agent.

If the user indicates that the intent is correctly predicted, a bot 125 can guide the user through the step-by-step instructions of realizing their intent. For example, if the user is making a one-time payment, the bot 125 can ask the user for payment information and/or the amount of the payment. Once the information is received, the bot 125 can complete the payment.

The system 100 can detect whether the device 110, 120 is a 5G handset, or and whether the device 110, 120 is a 4G, or a 3G phone having high bandwidth, such as Wi-Fi. If the device is a 5G handset, the system 100 can check whether the 5G handset has access to a 5G wireless telecommunication network. If the device is a 5G handset and/or has access to high bandwidth, the system can notify the device 110, 120 that there is an application 135 that can address the user's concern. The application 135 can enable the user to navigate menus through the application and make all the necessary selections through the application. The application may or may not be installed on the device 110, 120. For example, the application can be downloaded from cloud stores such as Play Store or Apple Store, or the application can execute remotely on a cloud computer.

Interacting with the application 135 can be preferable to interacting with the IVR system 100 because the application 135 can provide a visualization of the user's selections performed in the application, as opposed to the system 100 which is an audio system and cannot provide a visualization of user's responses.

In addition, the application 135 can provide faster interaction as opposed to an IVR system using audio-only prompts. The application 135 can provide increased accuracy by allowing callers to see multiple options before making a selection. The application 135 can provide improved dialogue with an information-rich, web-based input that allows alpha-numeric data to be easily entered. The application 135 can improve interaction experience for a user with a disability such as with hearing, voice and speech challenges. The application 135 can tailor visual experiences based on what we know about device 110, 120, such as whether the device is constantly having slowness issues or whether there is an upcoming bill due date. Based on the user needs and the predicted user intent, the application 135 can show a dynamic menu instead of generic static menu that does not match each user's needs. The machine learning model 105 can determine the menu to show in the application 135 based on the data gathered from sources 140, 150, 160, 170, 180, 190.

In addition to the application 135, the user device 110, 120 with high throughput can enable face-to-face interaction with an agent such as through video conferencing, real time chats, screen sharing, co-browsing a website, and exchanging image documents and signatures in real time. The agent can be a human agent, or a bot designed to interact with the user. If the bot is interacting through videoconferencing, a photorealistic rendering or animation of a person can be presented to the user. The agent can share the screen, and/or a visualization of the topic of the conversation between the user and the agent, because the user device 110, 120 has high throughput such as a 5G wireless telecommunication network or a Wi-Fi connection. The agent can push visual content onto the user device 110, 120 so that both sides can see the same content. The visual content can include webpages, videos, images, 3D geometry, etc. By contrast, today's IVR systems can only push text messages such as short message service (SMS), but not visual content.

The module 145 can perform speech recognition and can include two bots 155, 165 which can receive speech through voice or a data plan of the wireless telecommunication network. The module 145 can be Avaya Aura® Experience Portal. The IVR platform 175 can include multiple bots 105, 125 that can perform various functions, such as fulfilling purchase orders, enabling the user to make payments, guiding the user to realize their intent, etc.

Figure 2:
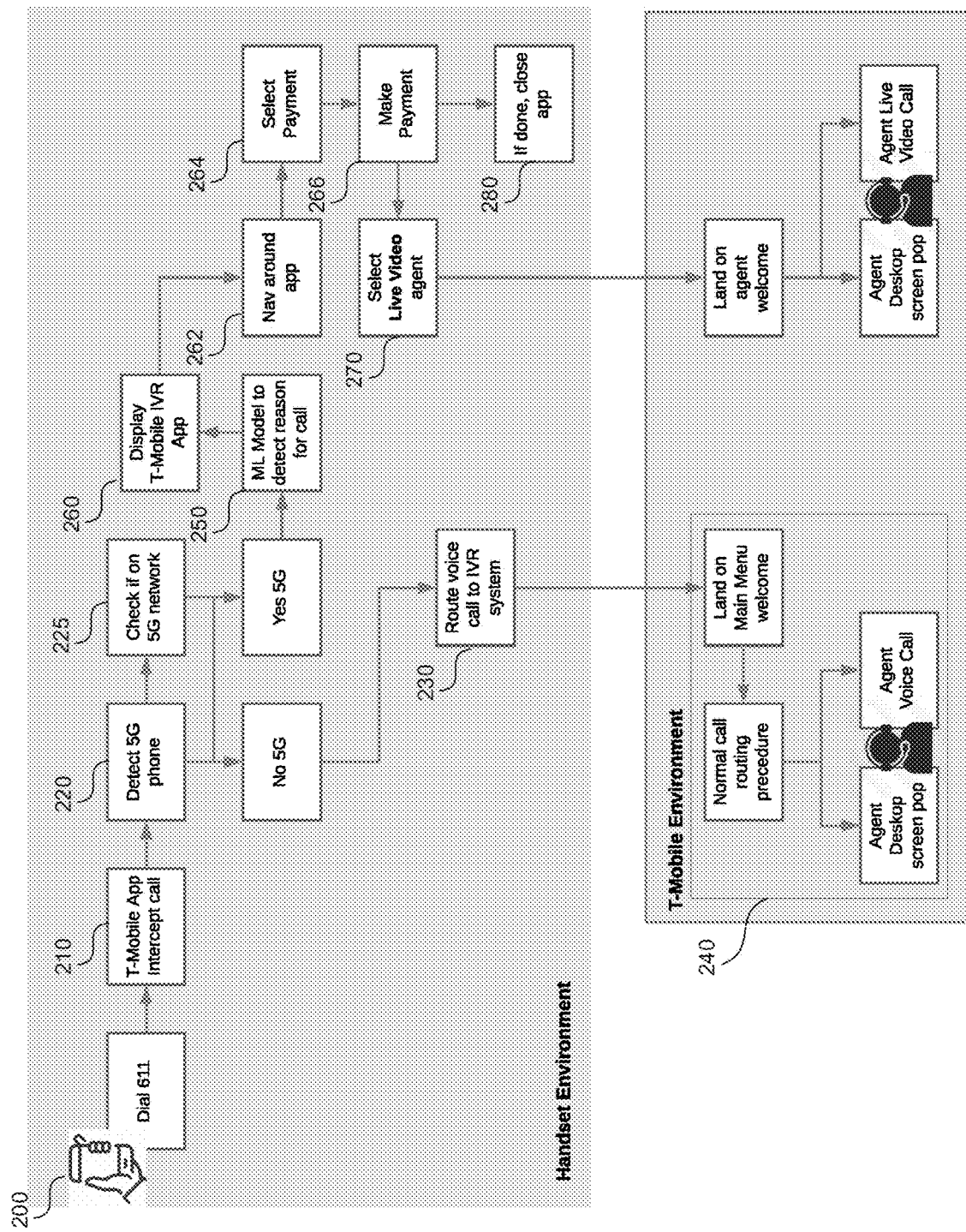
FIG. 2 is a diagram of an example of an IVR workflow, according to the present technology.

FIG. 2 is a diagram of an IVR workflow, according to the present technology. The user device 200 can make a call to the IVR system 100 in FIG. 1 by dialing a predesignated number, such as 611, which can connect the user device 200 to user care.

In step 210, an application can intercept the call and, in step 220, detect whether the device 200 is a 5G device. If the device 200 is not a 5G device, in step 230, the system 100 can route the call to a traditional IVR system 240. In step 225, the application can detect whether the device 200 is on a 5G network. If the device is not on the 5G network, even though the device is 5G, the system 100 can route the call to the traditional IVR system 240.

If the device 200 is a 5G device, then the system 100, in step 250, can detect the intent of the call, based on information gathered from various sources 140, 150, 160, 170, 180, 190 in FIG. 1. Step 250 can include machine learning model 105 in FIG. 1. For example, the machine learning model 105 can detect that the user wants to make a payment because the system has detected that the user is late on a payment. In step 260, the system 100 can display an application 135 in FIG. 1 to enable the user to make a payment on the device 200. The user can navigate the application in steps 262, 264, 266. If the user is done, in step 280, the system 100 can close the application 135. After making the payment, if the user still wants to talk to an agent, in step 270, the system 100 can connect the user to talk to the agent through a video call because the device is a 5G device with high bandwidth.

Figure 3:
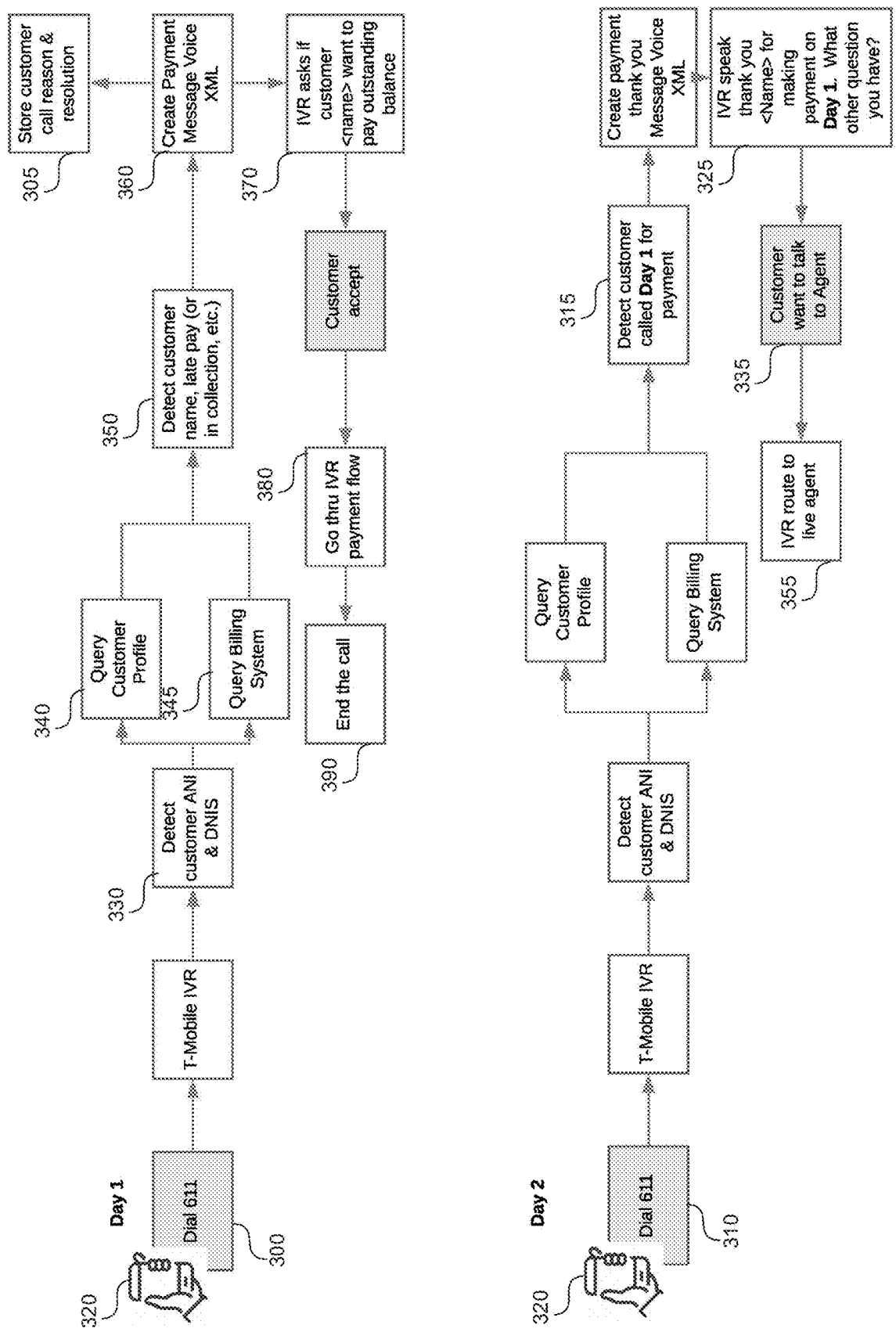
FIG. 3 is a diagram of a workflow using the prior history of interaction between the user and the IVR system to predict a user's intent.

FIG. 3 is a diagram of a workflow using the prior history of interaction between the user and the IVR system to predict a user's intent. The diagram in FIG. 3 presents two calls 300 and 310.

The call 300, occurring on a first day, may not have a relevant prior history for several reasons, such as, the user associated with the device 320 has not called the IVR system 100 in FIG. 1 before or the previous call is outside of a predetermined time window so that the previous call is not considered relevant. The predetermined time window can be a week, a month, a year. To determine the client intent during the call 300, the system 100, in step 330, can detect the device 320 Automatic Number Identification (ANI) and/or Dialed Number Identification Service (DNIS). ANI is a feature of a wireless telecommunication network for automatically determining the origination telephone number on toll calls. DNIS is a service that identifies the originally dialed telephone number of an inbound call.

In step 340, 345, the system 100 can gather information about the user from various sources 140, 150, 160, 170, 180, 190 in FIG. 1, including the user profile and the billing system. In step 350, the system 100 can detect the user name, and predict the user intent, as described in this application. For example, the user intent can be to make a late payment. In step 360, the system 100 can create a voice message, which is communicated in step 370, where the IVR system 100 asks the user, by name, if the user wants to make a payment. Once the user accepts, in step 380, the system 100 can lead the user through the payment flow, and in step 390 in the call.

In step 305, the system 100 can store the reason for the call and the resolution in a database.

Next time the user makes a call 310, the system 100, in step 315, can detect whether the user has called earlier within a predetermined time window, and can retrieve the reason and the resolution of the previous call 300. In step 325, the system 100 can remind the user of the previous call by, for example, thanking the user for making the payment. In addition, the system 100 can ask the user what the intent of the call 310 is, or the system 100 can make the prediction of the user intent based on the reason or the resolution of the previous call 300.

For example, if during the call 300 the user has purchased an item, the system 100 can determine that the intent of the user is to get an update on the status of the purchase. The system 100 can ask the user whether the intent is to get the status of the purchase. If that is intent of the user, the system 100 can provide the status. If that is not intent of the user, in step 335, the user can state the intent, such as, "I would like to speak to an agent." In step 355, the system can interpret the user intent from the natural language statement and can realize the intent of the user, by, for example, connecting the user to the agent.

Figure 4:
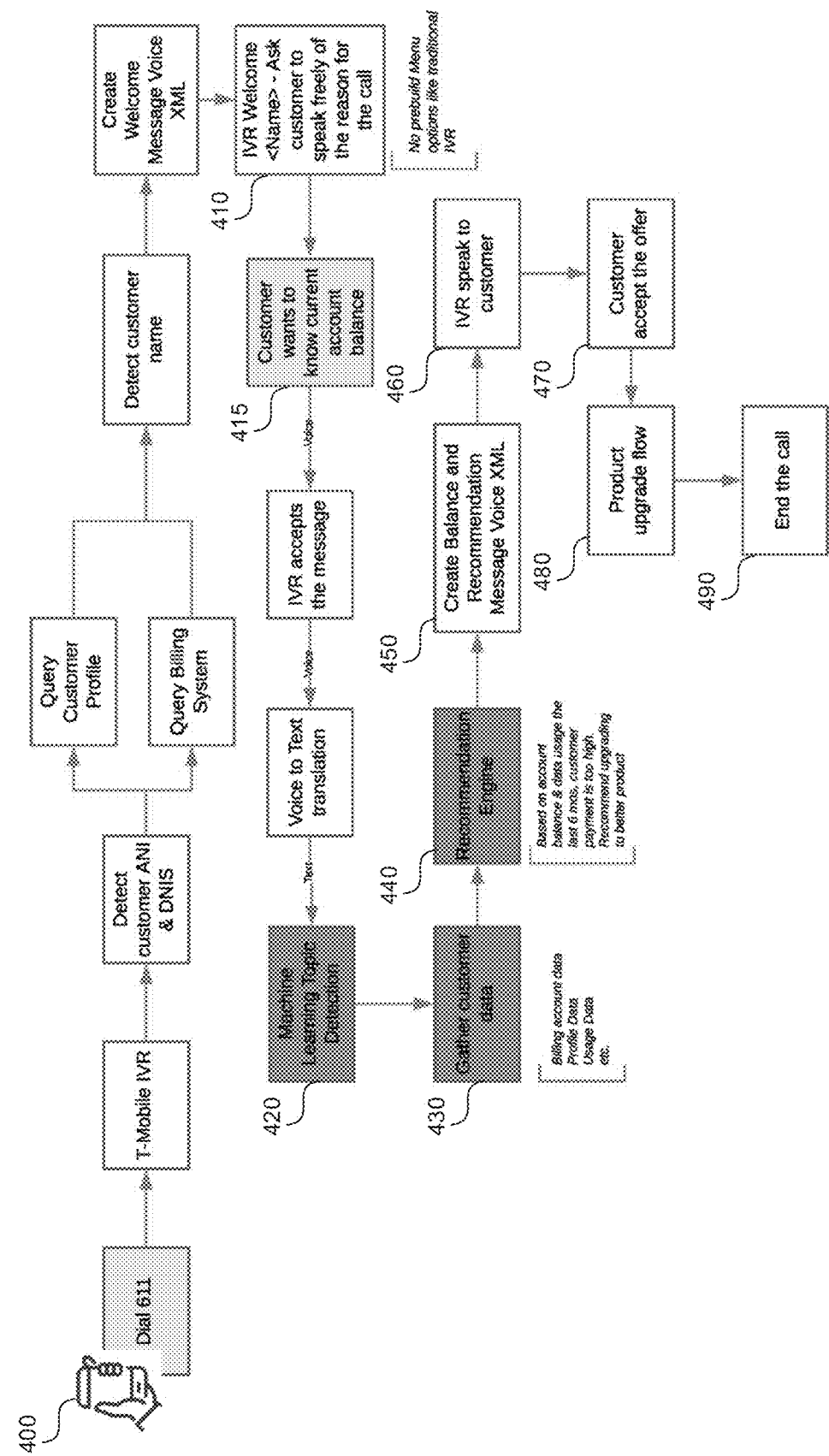
FIG. 4 is a diagram of a workflow to predict user intent and suggest additional actions to a user, once a user states the intent to the IVR system.

FIG. 4 is a diagram of a workflow to predict user intent and suggest additional actions to a user, once a user states the intent to the IVR system 100 in FIG. 1. The user device 400 can place a call to the IVR system 100. The IVR system 100 can predict the user intent, as described in this application, or the IVR system can ask the user about his intent in step 410. In step 415, the IVR system 100 can obtain from the user the natural language input describing the intent.

In step 420, a machine learning model can receive from voice to text translation ASR system 165 in FIG. 1 a text version of the natural language provided by the user. The machine learning model, in step 420, can predict a topic of the user's intent, such as billing, purchasing, shipment information, etc.

In step 430, the system 100 can obtain the topic predicted by the machine learning model in step 420 and can gather additional information associated with the user from various sources 140, 150, 160, 170, 180, 190 in FIG. 1. In step 440, the system 100 can predict the user intent based on the stated intent, and in addition can make a suggestion for an additional action.

For example, in step 440, the system can determine that based on account balance and data usage during the last 6 months, the user payment is too high. Consequently, the system 100 can recommend upgrading the service plan to a different service plan, or upgrading the user device 400 to a different user device.

In step 450, the system 100 can create a voice message to the user, for example, a message including the account balance, payment suggestion, product upgrade offer, network outage alert and/or a suggested action. In step 460, the system 100 can speak to the user and present the suggestion. In step 470, the user can accept the suggestion. In step 480, the system 100 can perform the suggested action, such as performing the product upgrades. In step 490, the system 400 can end the call.

Figure 5:
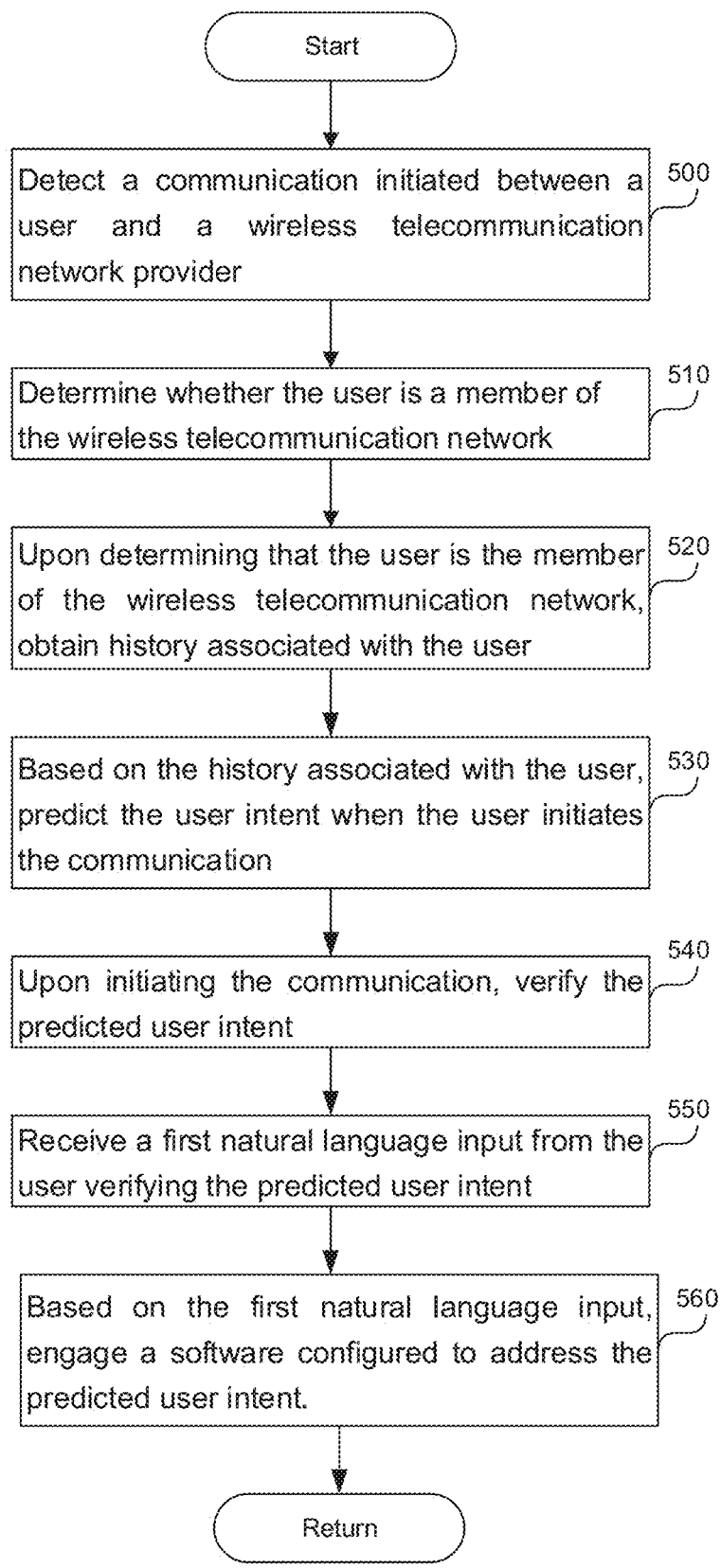
FIG. 5 is a flowchart of a method to determine a user intent when a user device initiates an interactive voice response (IVR) call with a wireless telecommunication network.

FIG. 5 is a flowchart of a method to determine a user intent when a user device initiates an interactive voice response (IVR) call with a wireless telecommunication network.

In step 500, a hardware or software processor executing the instructions described in this application can detect a communication initiated between a user device and a wireless telecommunication network. The communication can be an IVR call from the user to the customer care center of the wireless telecommunication network.

In step 510, the processor can determine whether the user device is a member of the wireless telecommunication network or is otherwise authorized to access the network. To determine whether the user device is a member, the processor can obtain a unique identifier of the user device, such as the phone number, international mobile subscriber identity (IMSI), etc. and based on the number can determine whether the user device is member of the network. Alternatively, the processor can determine the number that the user device called, and if the user device called a specially designated number for customer care, such as 611, likely to be known to user devices that are members, the processor can determine that the user device is a member of the telecommunication network. Further, in step 510 the system can determine that the user is authorized, e.g. by asking the user to provide a PIN code or otherwise provide some user-authenticating data to the wireless telecommunication network.

In step 520, upon determining that the user device is a member of, or subscriber to, the wireless telecommunication network, the processor can obtain history associated with a user of the user device including interaction history between the user and the wireless telecommunication network or a user billing status associated with the user of the wireless telecommunication network. The history associated with the user can include user posts on social media, history of user purchases within the telecommunication network or outside of the telecommunication network, shipment status, etc.

In step 530, based on the history associated with the user, the processor can predict the user intent when the user initiates the communication, before the user provides an input to the processor either through the user interface or verbally.

In step 540, upon initiating the communication, the processor can verify the predicted user intent, by for example asking the user "would you like to purchase an iPhone," or "would you like to make a payment on the outstanding balance".

In step 550, the processor can receive a first natural language input from the user verifying the predicted user intent. For example, the user can say "yes" to confirm the predicted intent or "no" to indicate the predicted intent is incorrect.

Based on the first natural language input, the processor can engage a software configured to address the user intent. For example, if the user replied "yes" in step 550, the processor can activate an application on the user device that is configured to address the user intent, or the processor can activate a box configured to interact with the user using natural language. In another example, if the user replied "no" in step 550, the processor can inquire further what the user intent is.

In addition, the processor can detect whether a device used to initiate the IVR call is a 5G capable device or if the user device has access to a high bandwidth connection, such as Wi-Fi. Upon the determining that the device is 5G capable and/or that the user device has access to the high bandwidth connection, and based on the predicted user intent, the processor can suggest to the user an application configured to execute on the user device, where the application is configured to address the predicted user intent. For example, if the user intent is to make a payment, the processor can suggest to the user an application that can run on the user device and help the user in making the payment. The application can already be installed on the user device, can be downloaded from a store, or can run on a cloud computer.

In addition, upon the determining that the device is 5G capable and/or that the user device has access to the high bandwidth connection, the processor can push visual content from the wireless telecommunication network to the device. The visual content can include videos, images, webpages, three-dimensional models, etc. By contrast, the current IVR service allows pushing of text messages, such as SMS messages, only.

The processor can receive a second natural language input from the user indicating that the predicted user intent is not accurate and indicating an accurate user intent. The processor can determine the accurate user intent from the second natural language input and can engage a second software configured to address the accurate user intent. For example, the processor can suggest to the user a second application configured to execute on the user device, where the second application is configured to address the accurate user intent. The processor can also initiate the communication between the user and an agent associated with the wireless telecommunication network. The communication can include creating a video conference session between the user and an agent associated with the wireless telecommunication network.

To create the video conference, the processor can detect bandwidth available to the user device by detecting whether the device is a 5G capable device or connected to a wireless network. Upon the determining that the device is the 5G capable device or connected to the wireless network, the processor can suggest to an agent to a connection type to offer to the user device. Upon the user device accepting the offer, the agent can create a video conference session between the user and the agent associated with the wireless telecommunication network.

In one example, to predict the user intent, the processor can obtain the billing status associated with the user. The billing status can include a time of month during which the user tends to make a payment to the wireless telecommunication network. The processor can determine a current time of month. The processor can compare the current time of month and the time of month during which the user tends to make the payment. Upon determining that the current time of month and the time of month during which the user tends to make the payment are substantially similar, the processor can predict that the user intent is to make the payment to the wireless telecommunication network.

In another example, to predict the user intent, the processor can obtain a device diagnostic associated with the device. The device diagnostic can include a processor load of the device, memory consumption, network load, etc. The processor can determine that the device diagnostic exceeds a predetermined threshold, such as by determining that the processor load exceeds a predetermined threshold. Upon determining that the device diagnostic exceeds the predetermined threshold, such as the processor threshold, the processor can predict that the user intent is associated with the performance of the device.

Computer

Figure 6:
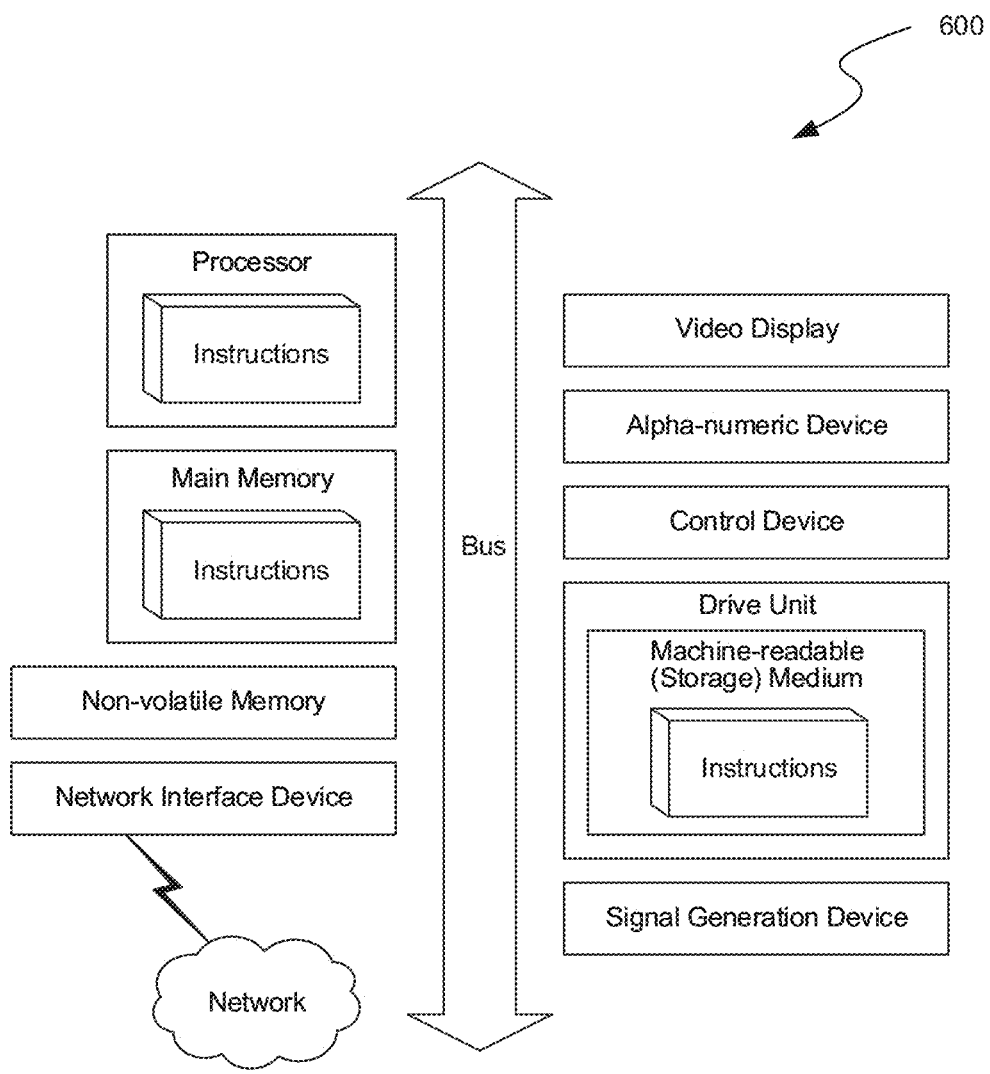
FIG. 6 is a diagrammatic representation of a machine in the example form of a computer system within which a set of instructions, for causing the machine to perform any one or more of the methodologies or modules discussed herein, can be executed.

FIG. 6 is a diagrammatic representation of a machine in the example form of a computer system 600 within which a set of instructions, for causing the machine to perform any one or more of the methodologies or modules discussed herein, can be executed.

In the example of FIG. 6, the computer system 600 includes a processor, memory, non-volatile memory, and an interface device. Various common components (e.g., cache memory) are omitted for illustrative simplicity. The computer system 600 is intended to illustrate a hardware device on which any of the components described in the example of FIGS. 1-5 (and any other components described in this specification) can be implemented. The computer system 600 can be of any applicable known or convenient type. The components of the computer system 600 can be coupled together via a bus or through some other known or convenient device.

The processor of the computer system 600 can perform the various methods described in this application, such as methods described in FIGS. 2-5. The processor of the computer system 600 can be associated with the user device 110, 120 in FIG. 1, and/or the IVR system 100 in FIG. 1, such as the IVR platform 175 in FIG. 1. The user device 110, 120 can communicate with the IVR system 100 using the network of the computer system 600 including a Wi-Fi network, an air interface, and/or a wired network. The main memory, the non-volatile memory, and/or a hard disk drive unit can store the instructions described in this application, such as instructions described in FIGS. 2-5.

This disclosure contemplates the computer system 600 taking any suitable physical form. As example and not by way of limitation, computer system 600 can be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 can include one or more computer systems 600; be unitary or distributed; span multiple locations; span multiple machines; or reside in a cloud, which can include one or more cloud components in one or more networks. Where appropriate, one or more computer systems 600 can perform without substantial spatial or temporal limitation one or more steps of one or more methods described or illustrated herein. As an example and not by way of limitation, one or more computer systems 600 can perform in real time or in batch mode one or more steps of one or more methods described or illustrated herein. One or more computer systems 600 can perform at different times or at different locations one or more steps of one or more methods described or illustrated herein, where appropriate software is typically stored in the non-volatile memory and/or the drive unit. Indeed, storing an entire large program in memory may not even be possible. Nevertheless, it should be understood that for software to run, if necessary, it is moved to a computer-readable location appropriate for processing, and for illustrative purposes, that location is referred to as the memory in this application. Even when software is moved to the memory for execution, the processor will typically make use of hardware registers to store values associated with the software, and a local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

While the computer-readable medium or computer-readable storage medium is shown in an exemplary embodiment to be a single medium, the term "computer-readable medium" and "computer-readable storage medium" should be taken to include a single medium or multiple media (e.g., a centralized or distributed database, and/or associated caches and servers) that store the one or more sets of instructions. The term "computer-readable medium" and "computer-readable storage medium" shall also be taken to include any medium that is capable of storing, encoding or carrying a set of instructions for execution by the machine and that cause the machine to perform any one or more of the methodologies or modules of the presently disclosed technique and innovation.

In some circumstances, operation of a memory device, such as a change in state from a binary one to a binary zero or vice versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice versa in a memory device can comprise a transformation, such as a physical transformation. Rather, the foregoing are intended as illustrative examples.

A storage medium typically can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

The above Detailed Description of examples of the invention is not intended to be exhaustive or to limit the invention to the precise form disclosed above. While specific examples for the invention are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the invention provided herein can be applied to other systems, not necessarily the system described above. The elements and acts of the various examples described above can be combined to provide further implementations of the invention. Some alternative implementations of the invention may include not only additional elements to those implementations noted above, but also may include fewer elements.

Any patents and applications and other references noted above, and any that may be listed in accompanying filing papers, are incorporated herein by reference in the entirety, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. § 112(f), other aspects may likewise be embodied as a means-plus-function claim, or in other forms, such as being embodied in a computer-readable medium. (Any claims intended to be treated under 35 U.S.C. § 112(f) will begin with the words "means for", but use of the term "for" in any other context is not intended to invoke treatment under 35 U.S.C. § 112(f).) Accordingly, the applicant reserves the right to pursue additional claims after filing this application to pursue such additional claim forms, in either this application or in a continuing application.

We claim:

1. A method to determine a user intent when a user device initiates an interactive voice response (IVR) call with a wireless telecommunication network managed by a wireless service provider, the method comprising:
   detecting the IVR call initiated with the wireless telecommunication network and to the wireless service provider;
   determining whether the user device is a member of the wireless telecommunication network;
   upon determining that the user device is the member of the wireless telecommunication network, obtaining a history associated with the user of the user device,
      wherein the history includes interaction history between the user and the wireless telecommunication network, or a user billing status associated with the user of the wireless telecommunication network;
   based on the history associated with the user, predicting the user intent when the user device initiates the IVR call;
   detecting whether the user device is a 5G capable device;
   upon the determining that the user device is the 5G capable device, detecting whether the user device is connected to a 5G wireless telecommunication network; and
   upon the determining that the user device is the 5G capable device and is connected to the 5G wireless telecommunication network, and based on the predicted user intent, suggesting to the user an application configured to execute on the user device,
      wherein the application is configured to address the predicted user intent.

2. The method of claim 1, further comprising:
   receiving a voice input from the user indicating that the predicted user intent is not accurate and indicating an accurate user intent;
   determining the accurate user intent from the voice input; and
   suggesting to the user a second application configured to execute on the user device,
      wherein the second application is configured to address the accurate user intent.

3. The method of claim 1, further comprising:
   receiving a natural language input from the user indicating that the predicted user intent is not accurate; and creating a video conference session between the user and an agent associated with the service provider for the wireless telecommunication network.

4. The method of claim 1, further comprising:
detecting bandwidth available to the user device by detecting whether the user device is a 5G capable device or connected to a wireless network; and
upon the determining that the user device is the 5G capable device or connected to the wireless network, creating a video conference session between the user and an agent associated with the wireless telecommunication network.

5. The method of claim 1, further comprising:
detecting bandwidth available to the user device by detecting whether the user device is a 5G capable device or connected to a wireless network; and
upon the determining that the user device is the 5G capable device or connected to the wireless network, and based on the predicted user intent, suggesting to the user the application configured to execute on the user device,
wherein the application is configured to address the predicted user intent.

6. The method of claim 1, further comprising:
detecting bandwidth available to the user device by detecting whether the user device is a 5G capable device or connected to a wireless network; and
upon the determining that the user device is the 5G capable device or connected to the wireless network, pushing a content from the wireless telecommunication network to the user device.

7. The method of claim 1, wherein predicting the user intent further comprises:
obtaining a billing status associated with the user, wherein the billing status includes a time of month during which the user tends to make a payment to the wireless service provider;
determining a current time of month;
comparing the current time of month and the time of month during which the user tends to make the payment; and
upon determining that the current time of month and the time of month during which the user tends to make the payment are substantially similar, predicting that the user intent is to make the payment to the wireless service provider.

8. The method of claim 1, wherein predicting the user intent further comprises:
obtaining a device diagnostic associated with the user device, wherein the device diagnostic includes a processor load of the user device;
determining that the processor load exceeds a predetermined threshold; and
upon determining that the processor load exceeds the predetermined threshold, predicting the user intent to be associated with a performance of the user device.

9. A system comprising:
one or more processors;
memory coupled to the one or more processors, wherein the memory includes instructions executable by the one or more processors to:
detect a communication initiated between a user device and a wireless telecommunication network;
determine whether the user device is a member of the wireless telecommunication network;
upon determining that the user device is the member of the wireless telecommunication network, obtain a history associated with a user of the user device including:
interaction history between the user and the wireless telecommunication network, or
a user billing status associated with the user of the wireless telecommunication network;
based on the history associated with the user, predict a user intent when the user initiates the communication, the instructions to predict the user intent further comprising instructions to:
obtain a device diagnostic associated with the user device the device diagnostic including a memory usage of the user device,
determine that the memory usage exceeds a redetermined threshold, and
upon determining that the memory us e exceeds the predetermine threshold, predict the user intent to be associated with a performance of the user device;
upon initiating the communication, verify the predicted user intent;
receive a first natural language input from the user verifying the predicted user intent; and
based on the first natural language input, engage a software configured to address the predicted user intent.

10. The system of claim 9, the instructions further comprising the instructions to:
receive a second natural language input from the user indicating that the predicted user intent is not accurate and indicating an accurate user intent;
determine the accurate user intent from the second natural language input; and
engage a second software configured to address the accurate user intent.

11. The system of claim 9, the instructions further comprising the instructions to:
receive a natural language input from the user indicating that the predicted user intent is not accurate and indicating an accurate user intent; and
initiate a communication between the user and an agent associated with the wireless telecommunication network.

12. The system of claim 9, the instructions further comprising the instructions to:
detect bandwidth available to the user device by detecting whether the user device is a 5G capable device or connected to a wireless network; and
upon the determining that the user device is the 5G capable device or connected to the wireless network, create a video conference session between the user and an agent associated with the wireless telecommunication network.

13. The system of claim 9, the instructions further comprising the instructions to:
detect bandwidth available to the user device by detecting whether the user device is a 5G capable device or connected to a wireless network; and
upon the determining that the user device is the 5G capable device or connected to the wireless network, and based on the predicted user intent, suggest to the user an application configured to execute on the user device, wherein the application is configured to address the predicted user intent.

14. The system of claim 9, the instructions further comprising the instructions to:
- detect bandwidth available to the user device by detecting whether the user device is a 5G capable device or connected to a wireless network; and
- upon the determining that the user device is the 5G capable device or connected to the wireless network, push a visual content from the wireless telecommunication network to the user device.

15. The system of claim 9, the instructions to predict the user intent further comprising the instructions to:
- obtain a billing status associated with the user, wherein the billing status includes a time of month during which the user tends to make a payment to the wireless telecommunication network;
- determine a current time of month;
- compare the current time of month and the time of month during which the user tends to make the payment; and
- upon determining that the current time of month and the time of month during which the user tends to make the payment are substantially similar, predict that the user intent is to make the payment to the wireless telecommunication network.

16. At least one computer-readable medium, excluding transitory signals and carrying instructions that, when executed by at least one data processor, performs a method comprising:
- detecting a communication initiated by a user device to a wireless service provider who manages a wireless telecommunication network;
- determining whether the user device is a subscriber of the wireless service provider and is authorized to use the wireless telecommunication network by:
  - obtaining a unique identifier of the user device comprising a phone number or international mobile subscriber identity (IMSI), and
  - based on the unique identifier, determining whether the user device is the subscriber of the wireless service provider and authorized to use the wireless telecommunication network;
- upon determining that the user device is the subscriber and is authorized on the wireless telecommunication network, obtaining historical data associated with the user of the user device, including interaction history between the user and the wireless service provider and a billing status associated with the user;
- based on the historical data associated with the user, predicting a user intent when the user initiates the communication with the wireless service provider;
- obtaining a device diagnostic associated with the user device, the device diagnostic including a network load of the user device;
- determining that the network load exceeds a redetermined threshold:
- upon determining that the network load exceeds the predetermined threshold;
- predicting the user intent to be associated with a performance of the user device;
- upon initiating the communication, verifying the predicted user intent;
- receiving a first natural language input from the user verifying the predicted user intent; and
- based on the first natural language input, engaging a software routine configured to address the predicted user intent.

17. The computer-readable medium of claim 16, further comprising:
- detecting bandwidth available to the user device by detecting whether the user device is a 5G capable device or connected to a wireless network that differs from the wireless telecommunication network; and
- upon the determining that the user device is the 5G capable device or connected to the wireless network, pushing a visual content from the wireless telecommunication network to the user device.

18. The computer-readable medium of claim 16, further comprising:
- obtaining the billing status associated with the user, wherein the billing status includes a time of month during which the user tends to make a payment to the wireless service provider;
- determining a current time of month;
- comparing the current time of month and the time of month during which the user tends to make the payment; and
- upon determining that the current time of month and the time of month during which the user tends to make the payment are substantially similar, predicting that the user intent is to make the payment to the wireless service provider.

* * * * *